US005477440A

United States Patent [19]

Brun

[11] Patent Number: 5,477,440

[45] Date of Patent: Dec. 19, 1995

[54] LOW-DAZZLE HEADLAMP FOR A MOTOR VEHICLE

[75] Inventor: Norbert Brun, Guermantes, France

[73] Assignee: Valeo Vision, Bobigny Cedex, France

[21] Appl. No.: 232,488

[22] Filed: Apr. 25, 1994

[30] Foreign Application Priority Data

Apr. 28, 1993 [FR] France .................................. 93 05003

[51] Int. Cl.[6] ................................ F21V 7/20; B60Q 1/04

[52] U.S. Cl. ........................... 362/298; 362/61; 362/294; 362/345; 362/346

[58] Field of Search ............................ 362/61, 294, 297, 362/298, 301, 307, 345, 346, 348, 349, 327

[56] References Cited

U.S. PATENT DOCUMENTS

| | | | |
|---|---|---|---|
| 1,519,318 | 12/1924 | Malcolm et al. . | |
| 1,660,699 | 2/1928 | Wood | 362/61 |
| 1,702,746 | 2/1929 | Prichard | 362/61 |
| 4,349,866 | 9/1982 | Molnar | 362/348 |
| 4,555,748 | 11/1985 | Bradley | 362/294 |
| 4,799,131 | 1/1989 | Aho et al. | 362/61 |

FOREIGN PATENT DOCUMENTS 2150275 10/1984 United Kingdom .

OTHER PUBLICATIONS

French Search Report, Jan. 6, 1994.

*Primary Examiner*—Ira S. Lazarus
*Assistant Examiner*—Y. Quach
*Attorney, Agent, or Firm*—Morgan & Finnegan

[57] ABSTRACT

A motor vehicle headlamp has a cover glass closing a reflector that contains a light source. The reflector comprises upper and lower portions joined through a reflective base. Its lower portion is reflective and/or diffusive, while its upper portion has reflective means which at least partly retransmit light from the source in a beam passing through the cover glass. The reflecting means comprise cylindro-elliptical or ellipsoidal Fresnel ribs which concentrate the reflected beam in a focal zone in front of the cover glass. The beam diverges beyond this focal zone.

5 Claims, 1 Drawing Sheet

LOW-DAZZLE HEADLAMP FOR A MOTOR VEHICLE

FIELD OF THE INVENTION

The present invention relates to motor vehicle headlamps.

BACKGROUND OF THE INVENTION

As is shown in FIG. 1 of the accompanying drawings, a motor vehicle headlamp conventionally includes a reflector 1 and a light source 2. The reflector 1 has a reflective base 4, for example of the parabolic type focussed in the region of the light source 2, together with an upper portion 5 and a lower portion 6, both of which are essentially flat and which extend from the top and bottom of the reflective base 4, respectively. Both the reflector 1 and the light source 2 are arranged inside a casing (not shown) that is open at one end, which open end is closed by a cover glass 3.

The upper portion 5 in some headlamps carries a metallic heat exchange plate 7, commonly called a radiator, the purpose of which is to prevent overheating of the headlamp. Conventionally, this radiator is reflective and diffusive, so that it retransmits some of the light which it receives from the light source 2 on to the lower portion 6. Where the latter is itself reflective or diffusive or both, then it will in its turn redirect the light in a beam LR, which is directed out of the headlamp as shown. This beam, resulting from double reflection, is a contributory factor to dazzle caused by the headlamp.

French patent document No. 2057246 discloses an optical unit for a motor vehicle, which is a headlamp of the general kind described above but in which the upper portion carries a striated element with Fresnel ribs. These ribs are parabolic and reflect outside the optical unit the light which they receive from the light source. The beam reflected in this way is a parallel beam having a high luminous intensity, which illuminates a portion of the road between the vehicle and that part of the road surface which is lit by the main beam from the optical unit. The optical unit proposed in French patent document No. 2057246 consequently eliminates that part of the zone which the driver usually sees as being in shadow in front of the vehicle.

Current thinking is that, for reasons of contrast, it is not desirable to illuminate this intermediate zone lying between the front of the vehicle and the zone lit by its main headlamp beams. Obstacles in the road will stand out better if this intermediate zone remains dark.

DISCUSSION OF THE INVENTION

An object of the present invention is to propose a motor vehicle headlamp having a form of construction that avoids the double reflection effects discussed above, but without giving any intense illumination of the shadow zone between the vehicle and the zone illuminated by the main beam of the headlamp.

According to the invention, a motor vehicle headlamp having a light source and a reflector closed by a cover glass, with the reflector comprising a reflective base and two portions, one lower and the other upper, which extend from the base, the lower portion being reflective and/or diffusive. In this respect, reflection from a smooth surface, like that of a mirror, takes place along a definite direction determined by the direction of the incident light ray, and is called regular or specular. Reflection from a rough or matte surface, like that of plaster or blotting paper, occurs in a great many directions from any one direction of the incident beam of light and is said to be diffuse or scattered (*Physics*, E. Hausmann et al., D. van Nostrand Company, Inc., New York, 1948, p. 636). Accordingly, for the purposes of this invention, the word "reflection" is generic not only to specular reflection and diffuse reflection, but also to a combination of diffuse and specular reflections. Further, the upper portion including reflecting means for at least partly retransmitting light, which it receives from the light source, as a beam which passes through the cover glass, is characterised in that the reflecting means concentrate the beam on to a zone lying in front of the cover glass from whence the beam diverges.

Preferably, this headlamp is of the type in which the upper portion of the reflector includes a metallic plate that constitutes a heat exchange element, with the reflecting means of the upper portion being carried by the said metallic plate.

The invention will be more clearly understood on a reading of the description of a preferred embodiment of the invention which follows, and which is given by way of example only and with reference to the accompanying drawings.

DESCRIPTION OF A PREFERRED EMBODIMENT OF THE INVENTION

Figure 1:
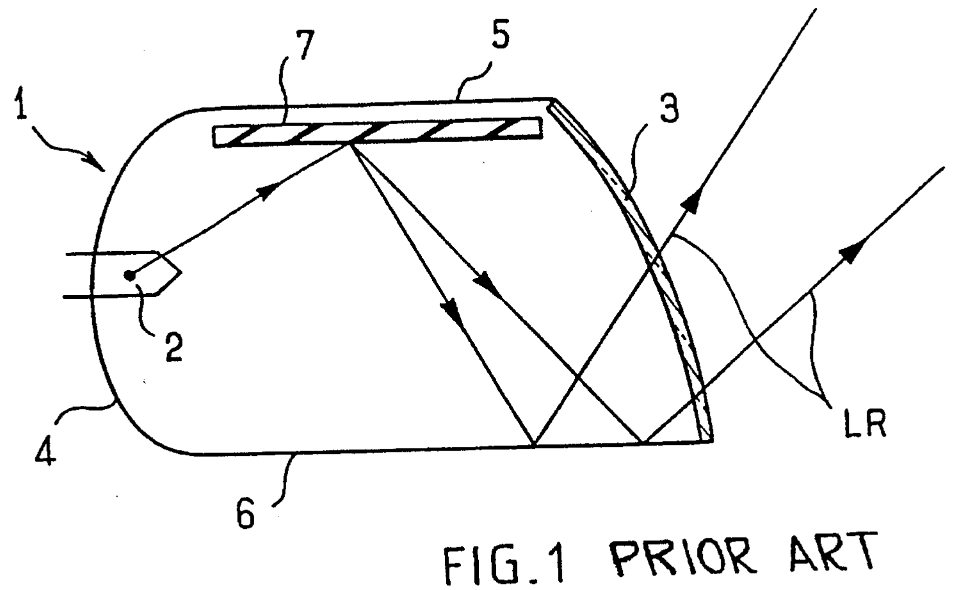
FIG. 1 PRIOR ART
FIG. 1 shows diagrammatically, in full section, a headlamp of the known kind in which the upper portion of the reflector carries a metallic plate constituting a radiator element.
Figure 2:
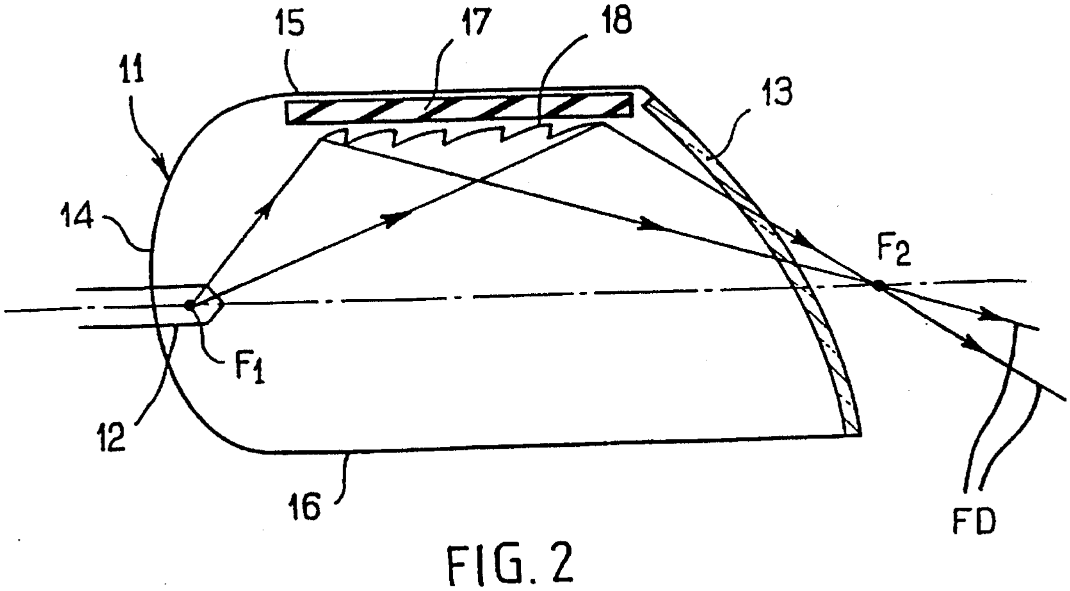
FIG. 2 shows diagrammatically, in full section, a headlamp in accordance with the present invention.

In FIG. 2, the same reference numerals as in the description of the prior art headlamp given above with reference to FIG. 1 are given to those elements which again appear in FIG. 2, with 10 added to each numeral.

The headlamp shown in FIG. 2 consists mainly of a reflector 11 and a light source 12. The reflector 11 and the light source 12 are mounted in a casing (not shown, to keep the drawing simple). The reflector 11 and the casing are closed by a cover glass 13 on the front of the headlamp. The reflector 11 has a base 14, together with a flat upper portion 15 and a flat lower portion 16. The base 14 is parabolic, with its focus $F_1$ lying close to the source 12.

The upper portion 15 includes a metallic plate or radiator plate 17 for heat exchange purposes, together with an array of Fresnel ribs 18 carried by the plate 17. These Fresnel ribs are circular, elliptical or ellipsoidal. In this respect, it should be noted that a circle and an ellipse both are "conic sections" in which a circle is a degenerate or special case for the ellipse. Thus, in a circle, the two foci on the major axis of the ellipse merge to form the center of the circle. Considered from a different standpoint, a circle can be defined as an ellipse with zero eccentricity. Accordingly, the word "ellipse" as used herein encompasses "circle" within its meaning. One of the two foci of the ribs 18 is a focal point or a line $F_1$ that is perpendicular to the plane of the drawing lying close to the light source 12. Their other focus is a focal point or a line lying in front of the cover glass 13 that is perpendicular to the plane of the drawing to define a focal zone, being indicated by the reference $F_2$ in FIG. 2.

The light emitted from the light source 12 towards the upper reflector portion 15 is thus reflected by the Fresnel ribs 18 in a beam FD, which is concentrated by the latter on a zone in front of the cover glass 13, i.e. on the focal point or line $F_2$. Beyond the focus $F_2$, the beam FD diverges towards the road, in such a way as to illuminate the road with only a low intensity of light. In consequence, none of the light received by the upper reflector portion 15 is reflected on to the lower reflector portion 16. Therefore, no dazzle results from the light from the source 12 which is incident on the upper portion 15.

FIG. 2 shows the foci $F_1$ and $F_2$ of the Fresnel elements 18 as lying in the principal plane of the headlamp. As shown in FIG. 2, this principal plane of the headlamp is perpendicular to the plane of the drawing and passes through the line defined by the foci $F_1$ and $F_2$. However, it will be realised that they may lie in some other plane.

The Fresnel elements can be replaced by any other reflecting means that comprises a circular, elliptical or ellipsoidal reflective portion, or, in more general terms, by any suitable means for concentrating the light emitted on to a zone in front of the cover glass of the headlamp.

What is claimed is:

1. A motor vehicle headlamp comprising a reflector having a reflective base, a light source in said reflector, a cover glass closing said reflector, a first portion and a second portion each respectively extending from said reflective base to said cover glass, said second portion being reflective, reflecting means for said first portion for retransmitting in a beam through said cover glass light incident upon said reflecting means from said light source, wherein said reflecting means define a focal zone in front of said cover glass, whereby the beam is concentrated in said focal zone and diverges therebeyond, said reflecting means have at least one reflective portion defining a first focus thereof at a line close to said light source, and a second focus thereof which is in said focal zone in front of said cover glass, said reflecting means being elliptical Fresnel ribs.

2. A motor vehicle headlamp comprising a reflector having a reflective base, a light source in said reflector, a cover glass closing said reflector, a first portion and a second portion each respectively extending from said reflective base to said cover glass, said second portion being reflective, reflecting means for said first portion for retransmitting in a beam through said cover glass light incident upon said reflecting means from said light source, wherein said reflecting means define a focal zone in front of said cover glass, whereby the beam is concentrated in said focal zone and diverges therebeyond, said reflecting means have at least one ellipsoidal reflective portion defining a first focus thereof close to said light source, and a second focus thereof which is in said focal zone in front of the cover glass, said reflecting means having ellipsoidal Fresnel ribs.

3. A motor vehicle headlamp comprising a reflector having a reflective base, a light source in said reflector, a cover glass closing said reflector, a first portion and a second portion each respectively extending from said reflective base to said cover glass, said second portion being reflective, reflecting means for said first portion for retransmitting in a beam through said cover glass light incident upon said reflecting means from said light source, wherein said reflecting means define a focal zone in front of said cover glass, whereby the beam is concentrated in said focal zone and diverges therebeyond, said reflecting means having Fresnel ribs.

4. A motor vehicle headlamp comprising a reflector having a reflective base, a light source in said reflector, a cover glass closing said reflector, a first portion and a second portion each respectively extending from said reflective base to said cover glass, said second portion being reflective, reflecting means for said first portion for retransmitting in a beam through said cover glass light incident upon said reflecting means from said light source, wherein said reflecting means define a focal zone in front of said cover glass, whereby the beam is concentrated in said focal zone and diverges therebeyond, said first portion of said reflector further has a metallic heat exchange plate carrying said reflecting means.

5. A headlamp according to claim 4, wherein said reflecting means has at least one ellipsoidal reflective portion defining a first focus thereof at a line close to said light source, and a second focus thereof which is in said focal zone in front of said cover glass, said reflecting means being elliptical Fresnel ribs.

* * * * *